(12) United States Patent
Pyzik et al.

(10) Patent No.: US 9,764,991 B2
(45) Date of Patent: Sep. 19, 2017

(54) METHOD FOR MAKING POROUS MULLITE-CONTAINING COMPOSITES

(71) Applicant: DOW GLOBAL TECHNOLOGIES LLC, Midland, MI (US)

(72) Inventors: Aleksander J. Pyzik, Midland, MI (US); Nicholas M. Shinkel, Linwood, MI (US); Robin P. Ziebarth, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 262 days.

(21) Appl. No.: 14/345,423

(22) PCT Filed: Nov. 7, 2012

(86) PCT No.: PCT/US2012/063894
§ 371 (c)(1),
(2) Date: Mar. 18, 2014

(87) PCT Pub. No.: WO2013/078005
PCT Pub. Date: May 30, 2013

(65) Prior Publication Data
US 2015/0037531 A1    Feb. 5, 2015

Related U.S. Application Data

(60) Provisional application No. 61/562,004, filed on Nov. 21, 2011.

(51) Int. Cl.
| | | |
|---|---|---|
| C04B 38/00 | (2006.01) |
| C04B 41/87 | (2006.01) |
| C04B 41/00 | (2006.01) |
| C04B 41/50 | (2006.01) |
| C04B 35/628 | (2006.01) |
| C04B 35/44 | (2006.01) |

(52) U.S. Cl.
CPC .......... *C04B 38/0096* (2013.01); *C04B 35/44* (2013.01); *C04B 35/6286* (2013.01); *C04B 35/62863* (2013.01); *C04B 35/62884* (2013.01); *C04B 35/62894* (2013.01); *C04B 35/62897* (2013.01); *C04B 38/0006* (2013.01); *C04B 38/0054* (2013.01); *C04B 41/009* (2013.01); *C04B 41/5037* (2013.01); *C04B 41/87* (2013.01); *C04B 2235/48* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 4,910,172 A | 3/1990 | Talmy et al. | |
| 6,306,335 B1 | 10/2001 | Wallin et al. | |
| 2004/0206062 A1* | 10/2004 | Ichikawa | B01D 53/9454 55/523 |
| 2005/0113249 A1 | 5/2005 | Ziebarth et al. | |
| 2007/0254808 A1 | 11/2007 | Yamada et al. | |
| 2008/0095690 A1 | 4/2008 | Liu | |
| 2008/0138568 A1 | 6/2008 | Tomita et al. | |

FOREIGN PATENT DOCUMENTS

| | | | | |
|---|---|---|---|---|
| EP | 0593278 B1 | 8/1997 | | |
| KR | WO 2008114895 A1 * | 9/2008 | ......... | C04B 38/0096 |
| WO | 0145828 A1 | 6/2001 | | |

* cited by examiner

*Primary Examiner* — David Sample
*Assistant Examiner* — Nicholas W Jordan
(74) *Attorney, Agent, or Firm* — The Dobrusin Law Firm, P.C.

(57) ABSTRACT

Porous aluminum-containing ceramic bodies are treated to form acicular mullite crystals onto the surfaces of their pores. The crystals are formed by contacting the body with a fluorine-containing gas or a source of both fluorine and silicon atoms to form fluorotopaz at the surface of the pores, and then decomposing the fluorotopaz to form acicular mullite crystals. This process allows the surface area of the ceramic body to be increased significantly while retaining the geometry (size, shape, general pore structure) of the starting body. The higher surface area makes the body more efficient as a particulate filter and also allows for easier introduction of catalytic materials.

18 Claims, 4 Drawing Sheets

METHOD FOR MAKING POROUS MULLITE-CONTAINING COMPOSITES

This invention relates to methods for making high-surface area porous ceramics.

Porous ceramics are being increasingly used as filter materials and as catalyst supports. Ceramics are usually much more thermally and chemically stable than other types of porous materials such as organic polymers, and therefore are materials of choice for use in many high-temperature and/or corrosive environments. For example, ceramic filters are widely used to remove particulate matter from combustion exhaust streams. Vehicle exhaust filters, and Diesel particulate filters in particular, are examples of such an application. Catalytic converters often include a ceramic filter that is laden with one or more catalytic substances.

Among the ceramic materials used in these applications are alumina, various aluminosilicates such as acicular mullite, cordierite and tialite, alkali aluminosilicates (including so-called "geopolymers"), aluminum titanate, silicon carbide. Acicular mullite bodies have a unique microstructure. The bodies are made up of highly elongated "whiskers" that are bonded together at their intersection points. The pores of acicular mullite bodies are highly interconnected and have complex geometries. The other ceramic materials lack this highly acicular structure. They instead tend to have a more defined pore structure characterized by very smooth pore walls.

Having smooth pore walls can be beneficial when pressure drop through the ceramic body is a concern, because smoother pore walls create less frictional drag on a gas stream passing through the filter. On the other hand, ceramic bodies that have smooth pores often have low surface areas. Having a high surface area can be very important when the ceramic body is used, for example, as a catalyst support, because high surface area can lead to a greater number of catalytic sites being available at which the catalyzed reaction can take place. Another problem with smooth-pored bodies is that applied coatings and/or catalytic materials sometimes tend not to adhere well to the pore surfaces. For these reasons it is sometimes desirable to increase the surface area of porous ceramic bodies.

One way of doing this is to try to coat the smooth pores with a high surface area material. This can be done by applying a coating material such as colloidal alumina, or through the growth of nanowires on the surface of the pores. However, these processes are not practical for application to larger parts, the applied materials are difficult to apply uniformly, and the applied materials often detach easily due to poor adhesion to the smooth pore surfaces.

This invention is a process for increasing the surface area of a starting porous aluminate-containing ceramic body, comprising (a) contacting the pores of the starting porous aluminate-containing ceramic body with a gaseous fluorine-containing compound or, if the starting porous aluminate-containing ceramic body does not contain silicon, a gaseous source of silicon atoms and fluorine atoms, at a temperature from 700 to 1200° C. to form a fluorotopaz on at least a portion of the surface of the pores of the porous aluminate-containing ceramic body and then (b) heating the ceramic body to a temperature of 1000 to 1500° C. to convert the fluorotopaz to acicular mullite whiskers attached to the surfaces of the pores of the ceramic body.

Surprisingly, the starting body reacts to form acicular mullite whiskers in the pores of the body, even though the starting body is a mass having a defined pore structure rather than simple accumulation of particles. More surprisingly, the pore structure and general dimensions of the starting body are essentially retained, with the exception that the roughness of the surface of the body, including the interior surfaces of the pores, is increased significantly due to the production of the acicular mullite whiskers. The acicular mullite whiskers are bonded to the rest of the ceramic structure, and so are securely attached thereto and do not become easily detached from the pore surfaces. This process therefore is an effective method for increasing the surface area of the starting ceramic body. The acicular mullite whiskers form very uniformly throughout the pore structure of the starting ceramic body.

Therefore, the invention is also a porous aluminate-containing ceramic body, wherein the aluminate is not acicular mullite, having acicular mullite crystals bonded to the internal surface of at least some of the pores.

Figure 1A:
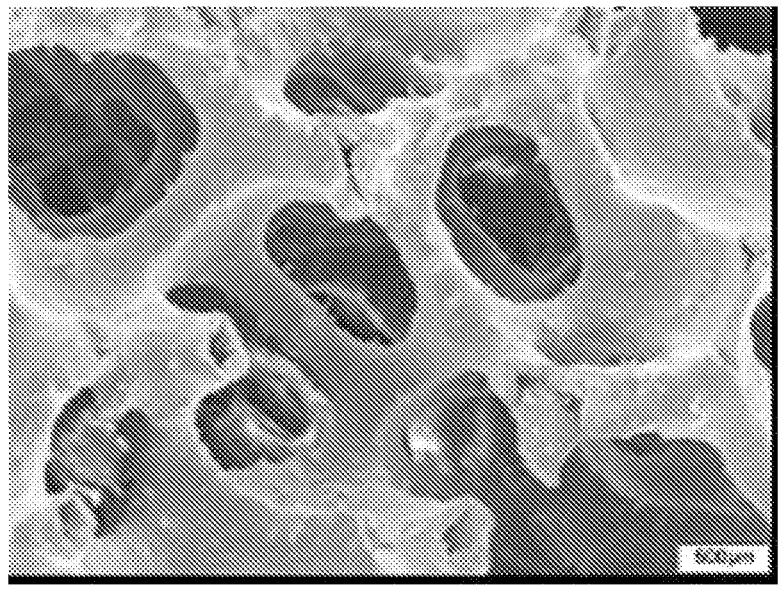
FIG. 1A is a micrograph of a prior art α-alumina foam.

The starting ceramic body is porous, and contains an aluminate-containing ceramic material. By "aluminate", it is meant simply that the ceramic material contains aluminum bonded to oxygen. The ceramic material may contain atoms of other metals or non-metals. Examples of aluminate-containing ceramics that are useful as the starting ceramic body include, for example, alumina; aluminum titanate; and various alumino-silicates such as non-acicular mullite, cordierite, alkali aluminosilicates including the so-called "geopolymer" materials, and the like. The ceramic body may be a composite of the ceramic material with another material that may be, for example, another ceramic or a metal (as in the case of a metal-infiltrated ceramic). The ceramic body preferably is densified to at least 90%, more preferably at least 95%, of the theoretical density, except for the presence of the pores.

The starting ceramic body is a macroscopic mass having defined pores, which is to say the body is not in the form of a fine particulate, but rather in the form of one or more larger unitary masses, each typically 10 grams or more in mass. Each of those unitary masses may be up to 10 kilograms or more.

The starting ceramic body generally will have a porosity of about 30% to 85%. Preferably, the starting ceramic body has a porosity of at least about 40%, more preferably at least about 45%, even more preferably at least about 50%, and most preferably at least about 55% to preferably at most about 80%, more preferably at most about 75%, and most preferably at most about 70%. Porosities are determined by immersion methods. The pore size may be, for example, from 1 to 100 microns (μm), preferably from 5 to 50 microns, more typically from about 10 to 50 microns or from 10 to 30 microns. "Pore size" is expressed for purposes of this invention as an apparent volume average pore diameter as measured by mercury porosimetry (which assumes cylindrical pores of circular cross-section).

The starting ceramic body in some embodiments may take the form of a honeycomb having one or more axially-extending cells defined by intersecting axially-extending porous walls. The walls and the intersection of such a honeycomb points define the number of cells, as well as their cross-sectional size and dimensions. A typical honeycomb for many filtration or catalysis applications will contain 20 to 300 cells/square inch (about 3 to 46 cells/square centimeter) of cross-sectional area (transverse to the axial direction). Wall thicknesses are typically from 0.025 to 10 mm, preferably from 0.05 to 1 mm, although larger or smaller wall thicknesses might be used. Such a honeycomb may be monolithic (i.e., formed in a single piece), or may be an assembly of smaller honeycomb structures which are manufactured separately and then assembled together, usually using a ceramic cement to adhere the individual pieces together.

The starting ceramic body is contacted with a gaseous fluorine-containing compound or, if the starting porous aluminate-containing ceramic body does not contain silicon, a gaseous source of silicon atoms and fluorine atoms. By "gaseous" it is meant that the compound is in the form of a gas under the temperature and pressure conditions that exist during this contacting step.

Examples of suitable fluorine-containing compounds include $SiF_4$, $AlF_3$, HF, $Na_2SiF_6$, NaF, $NH_4F$, methylene difluoride, trifluoromethane, tetrafluoromethane, 1,1,1,2,2-pentafluoroethane, 1,1,1,2-tetrafluoroethane, 1,2-trifluoroethane, 1,1,1-trifluroethane, 1,1-difluoroethane, 1,1,1,2,3,3,3-heptafluoropropane, 1,1,2,2,3,3-hexafluropropane, 1,1,1,3,3,3-hexafluoroethane, 1,1,2,2,3-pentafluropentane, 1,1,1,4,4,4-hexafluorobutane and 1,1,1,3,3-pentafluorobutane.

If the starting ceramic body lacks silicon atoms, it is contacted with a gaseous source of silicon atoms and fluorine atoms. A single compound such as $SiF_4$ or $Na_2SiF_6$ may provide both the silicon atoms and the fluorine atoms. It is also possible to use a mixture of at least one gaseous silicone-containing compound and at least one gaseous fluorine-containing compound.

$SiF_4$ is a preferred fluorine-containing compound, even when the starting ceramic body contains silicon atoms.

The starting body is contacted with the fluorine-containing compound or gaseous source or silicon and fluorine atoms at a temperature from 700 to 1200° C. To some extent, the fluorotopaz-forming reaction that occurs during this step competes with the subsequent decomposition of the fluorotopaz to form acicular mullite. However, the fluorotopaz-forming reaction predominates at lower temperatures of up to 1000° C., preferably up to 900° C. more preferably up to 800° C. It is usually preferable to perform the first step at these lower temperatures to better separate the fluorotopaz-forming reaction from the acicular mullite-forming reaction. The lower temperatures permit fluorotopaz formation to occur separately from the decomposition reaction that converts fluorotopaz to acicular mullite. It is typically preferred to perform this contacting step by first heating the green body under vacuum or an inert atmosphere such as nitrogen or a noble gas until it attains a temperature of at least 500° C. and thereafter introducing the fluorine-containing compound and continuing heating the ceramic body until the desired temperature for the fluorotopaz-forming step is achieved.

The process gas during the fluorotopaz-forming reaction may contain up to 100% of the fluorine-containing compound (or source of silicon atoms and fluorine atoms, as the case may be), but it is also possible to use a mixture that contains from 80 to 99%, especially from 85 to 95%, by weight of the reactive gaseous compound(s), with the remainder being inert gasses. The inert gasses may be, for example, various gaseous by-products that form from impurities contained in the starting materials or from the fluorotopaz-forming or acicular mullite-forming reactions.

A flow of the process gas may be established through the starting ceramic body during the fluorotopaz-forming step. This allows the process gasses to permeate through the pore structure and contact the internal surfaces of the pores.

The partial pressure of the fluorine-containing compound (or source(s) of silicon atoms and fluorine atoms, as the case may be) throughout this first reaction step can be adjusted or maintained to a desired level, and/or may be allowed to vary during the course of the reaction. Control over the partial pressure of the gaseous reactive compound(s) allows for some control over the reaction rate. A typical partial pressure of the gaseous reactive compound(s) is from 400 to 1000 torr (53.2 to 133.3 kPa), especially from 400 to 750 torr (53.2 to 99.7 kPa). It is possible to vary the partial pressure during the course of the reaction.

During this first contacting step, fluorotopaz forms on the exposed surfaces of the ceramic body, including, to the extent the process gas has permeated through the pore structure, the surfaces of the pores. Because the fluorine-containing compound (and source of silicon atoms, if present) are gasses, they can easily permeate through the pore structure and react even at the surface of internal pores, especially when the process gas is caused to flow through the body. As a result, fluorotopaz formation typically occurs throughout the pore structure of the body.

Because the process gasses cannot easily penetrate into the densified ceramic material, the fluorotopaz formation is believed to occur almost exclusively at the exposed surfaces of the ceramic material, including along the walls of the pores.

The ceramic body is then heated to a temperature of 1000 to 1500° C. in a non-oxidizing atmosphere to convert the fluorotopaz to acicular mullite whiskers attached to the surfaces of the pores of the ceramic body. At these higher temperatures, the fluorotopaz decomposition reaction to form acicular mullite greatly predominates, even when this step is performed in the presence of the fluorine-containing gas and/or gaseous source(s) of silicon and fluorine atoms. Therefore, the atmosphere during this step may include such compound(s). The partial pressure of fluorine-containing compound or source(s) of silicon atoms and fluorine atoms, as the case may be, is advantageously not greater than 755 torr (100 kPa) and can be any lower value, including zero torr. It is preferred to conduct this second step in an atmosphere that contains either none of the fluorine-containing compound or source(s) of silicon and fluorine atoms, or a partial pressure of such compound(s) which is no more than 250 torr (33.2 kPa), preferably from 50 to 250 torr (6.7 to 33.2 kPa) or from 50 to 150 torr (6.7 to 20 kPa).

Fluorotopaz releases silicon tetrafluoride gas as it decomposes to form acicular mullite. This process is endothermic. The temperature during the fluorotopaz-decomposition step is preferably at least 1050° C., or at least 1100° C. preferably is no higher than 1300° C. or no higher than 1200° C. The body should be held at that temperature until the fluorotopaz decomposition is complete. The decomposition reaction is complete when the body no longer releases silicon tetrafluoride.

As the fluorotopaz decomposes, acicular mullite crystals form. These acicular mullite crystals form on all surfaces of the ceramic body on which fluorotopaz formed in the first reaction step, including the interior surfaces of the pores of the starting body. The acicular mullite crystals are elongated as is typical of acicular mullite; the aspect ratio of the mullite crystals is typically at least 5, more preferably at least 10. The crystals may have a mean diameter of 1 to 50 microns, preferably from 1 to 20 microns. These crystals generally extend outwardly from the pore surfaces into the pores of the ceramic body. The lengths of the crystals may be up to about 200 microns, more typically from 10 to 150 microns.

It may be necessary or desirable to remove residual fluorine from the resulting ceramic body. This is conveniently accomplished by heating the composite to a temperature of at least 1200° C., such as from 1200 to 1460° C., for a period of time. This heating step is preferably performed in the presence of an atmosphere that contains some water, such as moist air or other inert atmosphere which contains some quantity of moisture. The amount of water needed in atmosphere is generally not large, and the ambient humidity is usually sufficient.

The ceramic body obtained from the process closely matches that of the starting ceramic body in terms of overall dimensions, wall thicknesses, cell sizes and other dimensional aspects, except for increased surface area/unit mass and at most a small reduction in porosity and/or pore size. Surface area may be increased to as much as 10 times that of the starting ceramic body. More typically, the surface area may increase to 1.5 to 10 times that of the starting ceramic body, or to 1.5 to 5 times that of the starting body. The mass of the added acicular mullite crystals formed may be 1 to 50%, preferably 1 to 25% of the weight of the original body, such that the body obtained from the process weighs 1.01 to 1.5, preferably 1.01 to 1.25 times that of the starting body.

Bodies made in accordance with the invention are useful in a variety of filtration applications and/or as carriers for various types of functional materials, of which catalysts are of particular interest.

The body can be used as a particulate filter, especially for removing particulate matter from power plant (mobile or stationary) exhaust gases. A specific application of this type is a soot filter for an internal combustion engine, especially a diesel engine.

Functional materials can be applied to the body using various methods. The functional materials may be organic or inorganic. Inorganic functional materials such as metals and metal oxides are of particular interest as many of these have desirable catalytic properties, function as sorbents or perform some other needed function. One method of introducing a metal or metal oxide onto the body is by impregnating the body with a solution of a salt or acid of the metal, and then heating or otherwise removing the solvent and, if necessary, calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the body with colloidal alumina, followed by drying, typically by passing a gas through the impregnated body. This procedure can be repeated as necessary to deposit a desired amount of alumina. Other ceramic coatings such as titania can be applied in an analogous manner. An advantage of this invention is that, due to the presence of the acicular mullite whiskers on internal pore surfaces (and resulting high surface area), metals and other catalytic substances often can be deposited directly onto the body, without the need to first apply an intermediate coating such as alumina to roughen the internal pore surfaces.

Metals such as barium, platinum, palladium, silver, gold and the like can be deposited on the body by impregnating the body a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the body in that manner. The metal can be deposited onto the body to form a filter that is simultaneously capable of removing particulates such as soot, $NO_x$ compounds, carbon monoxide and hydrocarbons from a power plant exhaust, such as from vehicle engines.

Suitable methods for depositing various inorganic materials onto a porous ceramic body are described, for example, in US 2005/0113249 and WO 01/045828. These processes are generally useful in relation to the body of this invention.

The following examples are provided to illustrate the invention but are not intended to limit the scope thereof. All parts and percentages are by weight unless otherwise indicated.

EXAMPLE 1

A commercially available α-alumina foam having smooth dense walls and a porosity of about 90 volume-% is heated to a temperature of about 800° C. under an $SiF_4$ atmosphere ($SiF_4$ partial pressure 400 torr) for 8 hours. The temperature is then increased to 1150° C. for 2 hours to form acicular mullite crystals on the external and internal pore surfaces of the foam. The surface area of the starting foam is 0.06 $m^2/g$. After the described treatment, the surface area of the foam is increased to 0.2 $m^2/g$, or to about 350% of the initial value.

Figure 1B:
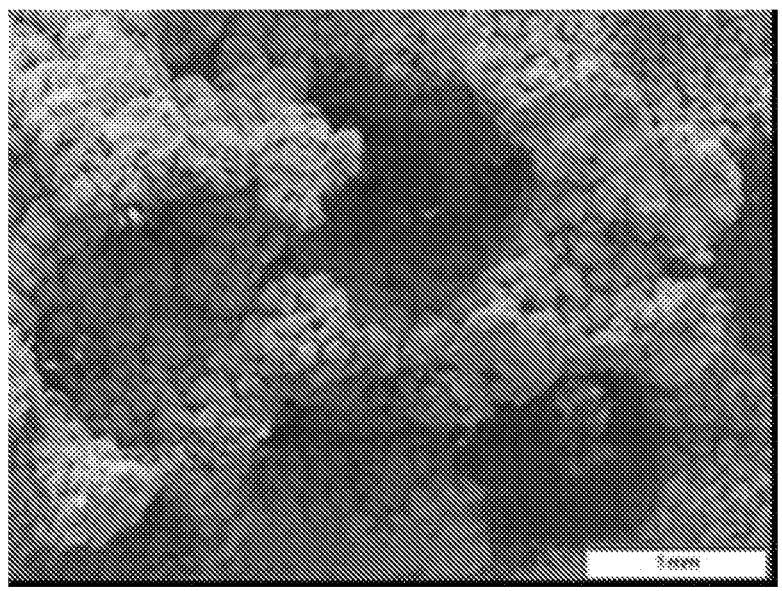
FIG. 1B is a micrograph of the α-alumina foam of FIG. 1A, after the introduction of acicular mullite crystals onto pore surfaces in accordance with the invention.
Figure 1C:
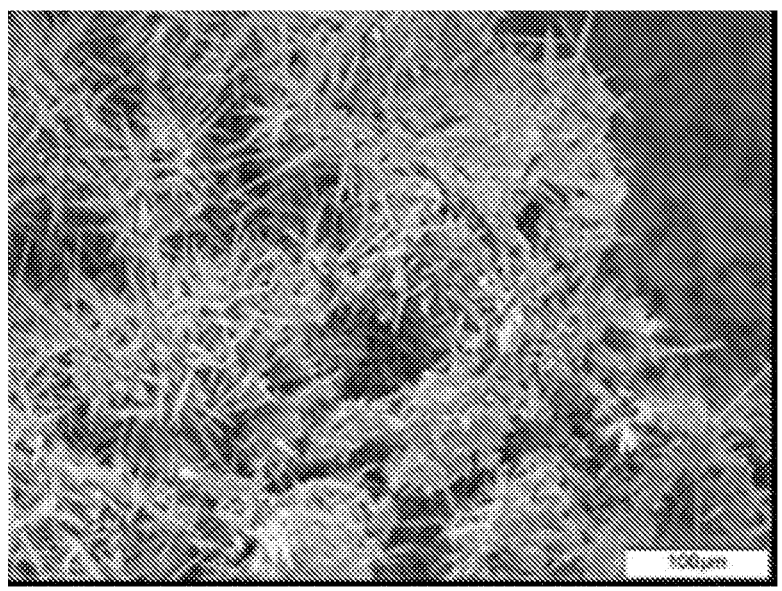
FIG. 1C is a micrograph at higher magnification of the α-alumina foam of FIG. 1A, after the introduction of acicular mullite crystals onto pore surfaces in accordance with the invention.

FIG. 1A is a micrograph of the starting alumina foam, showing the smooth, dense walls. FIGS. 1B and 1C are micrographs of the treated foam. Spiky clusters of acicular mullite are seen to have grown on the pore walls. The average length of the acicular mullite crystals is in the range 50-150 microns.

EXAMPLE 2

Figure 2A:
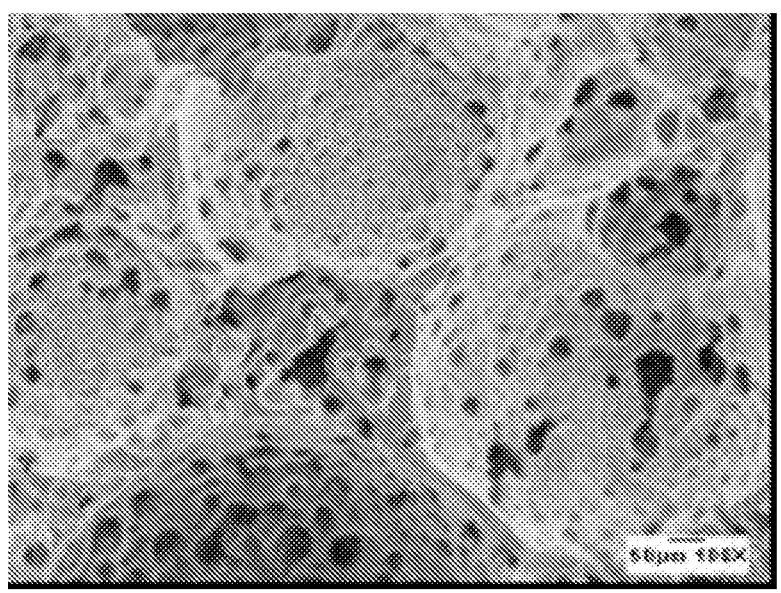
FIG. 2A is a micrograph of a prior art alkali aluminosilicate foam.
Figure 2B:
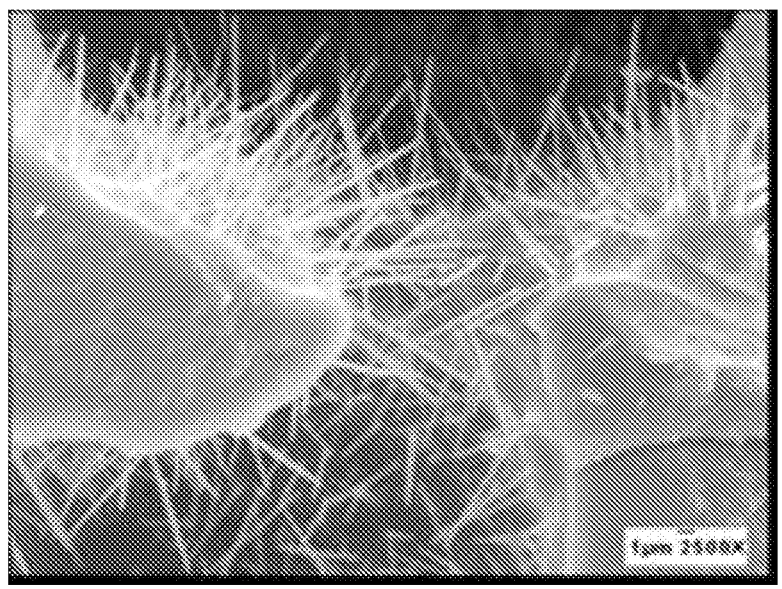
FIG. 2B is a micrograph of the alkali aluminosilicate foam of FIG. 2A, after the introduction of acicular mullite crystals onto pore surfaces in accordance with the invention.

An alkali aluminosilicate foam is made by calcining a mixture $SiO_2$, $Al_2O_3$ and $Na_2O$ at 1100° C. This foam has smooth dense walls as shown in FIG. 2A. This foam is treated in the general manner described in Example 1 to produce acicular mullite crystals on the pore surfaces. FIG. 2B is a micrograph of the treated foam. As can be see in FIG. 2B, the pore surfaces have become highly roughened and their surface area is increased significantly.

EXAMPLE 3

A polyurethane foam is immersed in a precursor slurry, dried and calcined at 1000° C. to form an alumina foam. The polyurethane foam is burned out during the calcination step. The alumina foam is treated in the same general manner as described in Example 1. The internal pore surfaces become covered with acicular mullite crystals approximately 50 microns in length.

EXAMPLE 4

Figure 3:
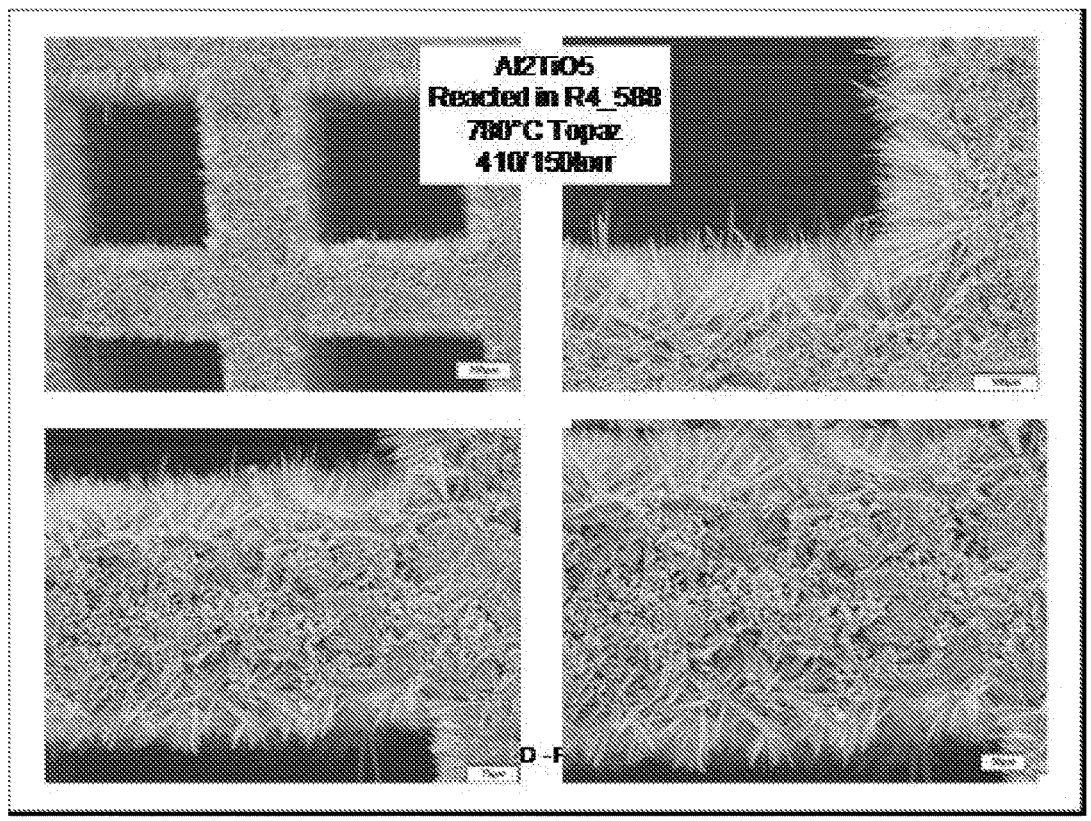
FIG. 3 is a micrograph of an alumina titanate honeycomb, after the introduction of acicular mullite crystals onto pore surfaces in accordance with the invention.

An aluminum titanate honeycomb having porous cell walls is treated in the same general manner described in Example 1. Acicular mullite crystals form on the surfaces of the cell walls. Upon longer exposure to the $SiF_4$, acicular mullite crystals also form within the pores in the walls. FIG. 3 is a micrograph of the treated aluminum titanate honeycomb, showing the presence of acicular mullite crystals on the wall surfaces.

EXAMPLE 5

Figure 4:
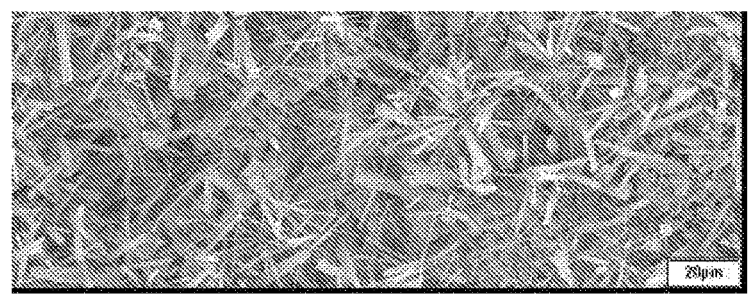
FIG. 4 is a micrograph of a cordierite honeycomb, after the introduction of acicular mullite crystals onto pore surfaces in accordance with the invention.

A cordierite honeycomb having porous cell walls is reacted at 1000° C. with 1,1,1,2-tetrefluoroethane gas for 5 hours, and then at 1100° C. for 2 hours to produce acicular mullite crystals. As a result of this treatment, approximately 10% of the cordierite is converted to acicular mullite, which forms crystals on the cell walls and in the pores of the cell walls. The acicular mullite crystals are 20-30 microns in length. FIG. 4 is a micrograph of a portion of the surface of the treated honeycomb and shows the presence of acicular mullite crystals.

What is claimed is:

1. A porous aluminate-containing ceramic body, wherein the aluminate is not acicular mullite, the ceramic body having acicular mullite crystals from decomposition of fluorotopaz bonded to an external surface of the ceramic body and internal pore surfaces of at least some of the pores, wherein a surface area of the ceramic body is increased to about 1.5 to about 10 times that of an aluminate-containing ceramic body without acicular mullite crystals, and wherein the ceramic body is a filter for removing particulate matter from combustion exhaust streams.

2. The ceramic body of claim 1, wherein the aluminate is selected from alumina, aluminum titanate, non-acicular mullite, cordierite and an alkali aluminosilicate.

3. The ceramic body of claim 1, wherein the ceramic body is densified to at least 90% of its theoretical density, except for the presence of the pores.

4. The ceramic body of claim 1, which has a porosity of about 30% to 85%.

5. The ceramic body of claim 1, wherein the pore size is from 5 to 50 microns, as measured by mercury porosimetry.

6. The ceramic body of claim 1, which is a honeycomb having one or more axially-extending cells defined by intersecting axially-extending porous walls.

7. The ceramic body of claim 1, wherein the acicular mullite crystals are bonded to the internal surface of at least some of the pores by contacting the pores with a gaseous fluorine-containing compound or a gaseous source of silicon atoms and fluorine atoms to form a fluorotopaz on the internal surface of at least some of the pores and heating the ceramic body to convert the fluorotopaz to the acicular mullite crystals.

8. The ceramic body of claim 7, wherein the fluorine-containing compound is one or more of $SiF_4$, $AlF_3$, HF, $Na_2SiF_6$, NaF, $NH_4F$, methylene difluoride, trifluoromethane, tetrafluoromethane, 1,1,1,2,2-pentafluoroethane, 1,1,1,2-tetrafluoroethane, 1,1,2-trifluoroethane, 1,1,1-trifluoroethane, 1,1-difluoroethane, 1,1,1,2,3,3,3-heptafluoropropane, 1,1,2,2,3,3-hexafluoropropane, 1,1,1,3,3,3-hexafluoroethane, 1,1,2,2,3-pentafluoropentane, 1,1,1,4,4,4-hexafluorobutane and 1,1,1,3,3-pentafluorobutane.

9. The ceramic body of claim 1, wherein the acicular mullite crystals are uniformly distributed throughout the pores of the ceramic body.

10. A process for making the porous aluminate-containing ceramic body of claim 1, comprising
    (a) contacting the pores of a starting porous aluminate-containing ceramic body with a gaseous fluorine-containing compound or, if the starting porous aluminate-containing ceramic body does not contain silicon, a gaseous source of silicon atoms and fluorine atoms, at a temperature from 700 to 1200° C. to form a fluorotopaz on at least a portion of the surface of the pores of the porous aluminate-containing ceramic body and then
    (b) heating the ceramic body to a temperature of 1000 to 1500° C. to convert the fluorotopaz to acicular mullite whiskers attached to the surfaces of the pores of the ceramic body and to an external surface of the ceramic body.

11. The process of claim 10, wherein the aluminate is selected from alumina, aluminum titanate, non-acicular mullite, cordierite and an alkali aluminosilicate.

12. The process of claim 10, wherein the starting ceramic body preferably is densified to at least 90% the theoretical density, except for the presence of the pores.

13. The process of claim 10, wherein the starting ceramic body has a porosity of about 30% to 85%.

14. The process of claim 10, wherein the pore size is from 5 to 50 microns, as measured by mercury porosimetry.

15. The process of claim 10, wherein the fluorine-containing compound is one or more of $SiF_4$, $AlF_3$, HF, $Na_2SiF_6$, NaF, $NH_4F$, methylene difluoride, trifluoromethane, tetrafluoromethane, 1,1,1,2,2-pentafluoroethane, 1,1,1,2-tetrafluoroethane, 1,1,2-trifluoroethane, 1,1,1-trifluoroethane, 1,1-difluoroethane, 1,1,1,2,3,3,3-heptafluoropropane, 1,1,2,2,3,3-hexafluoropropane, 1,1,1,3,3,3-hexafluoroethane, 1,1,2,2,3-pentafluoropentane, 1,1,1,4,4,4-hexafluorobutane and 1,1,1,3,3-pentafluorobutane.

16. The process of claim 10, wherein the starting ceramic body is a honeycomb having one or more axially-extending cells defined by intersecting axially-extending porous walls.

17. The process of claim 10, wherein the surface area of the product ceramic body is increased to 1.5 to 10 times that of the starting ceramic body.

18. The process of claim 10 further comprising, after step b), depositing a metal onto the surface of the ceramic body.

* * * * *